(12) United States Patent
Schaper

(10) Patent No.: US 12,331,881 B2
(45) Date of Patent: Jun. 17, 2025

(54) METHOD FOR PRODUCING A PRESSURE VESSEL AND PRESSURE VESSEL

(71) Applicant: Bayerische Motoren Werke Aktiengesellschaft, Munich (DE)

(72) Inventor: Sebastian Schaper, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 10 days.

(21) Appl. No.: 17/912,921

(22) PCT Filed: Jun. 2, 2021

(86) PCT No.: PCT/EP2021/064736
§ 371 (c)(1),
(2) Date: Sep. 20, 2022

(87) PCT Pub. No.: WO2022/002517
PCT Pub. Date: Jan. 6, 2022

(65) Prior Publication Data
US 2023/0151928 A1 May 18, 2023

(30) Foreign Application Priority Data
Jul. 1, 2020 (DE) ...................... 10 2020 117 307.5

(51) Int. Cl.
*F17C 1/16* (2006.01)
*B29C 70/86* (2006.01)

(52) U.S. Cl.
CPC .............. *F17C 1/16* (2013.01); *B29C 70/86* (2013.01); *F17C 2201/0109* (2013.01);
(Continued)

(58) Field of Classification Search
None
See application file for complete search history.

(56) References Cited

U.S. PATENT DOCUMENTS 6,779,565 B1   8/2004   Fawley
8,602,250 B2 *  12/2013  Berger ..................... D04C 1/06
                                                    220/586
(Continued)

FOREIGN PATENT DOCUMENTS

CN   102563062 A   7/2012
CN   108472902 A   8/2018
(Continued)

OTHER PUBLICATIONS

International Search Report (PCT/ISA/210) issued in PCT Application No. PCT/EP2021/064736 dated Sep. 1, 2021 with English translation (six (6) pages).

(Continued)

*Primary Examiner* — Barbara J Musser
(74) *Attorney, Agent, or Firm* — Crowell & Moring LLP

(57) ABSTRACT

A pressure vessel and a method for producing a pressure vessel are provided. The pressure vessel has a liner and a fiber-reinforced laminate, which surrounds the liner and has a first fiber layer and a second fiber layer, which are incorporated in a matrix material. The method includes: a) providing the liner for storing a fluid, having a cylindrical region and two cap regions at opposite ends of the cylindrical region, b) wrapping a fibrous material impregnated (Continued)

with matrix material around the liner at the cap regions and the cylindrical region to produce the first fiber layer, which is already permeated with matrix material, c) arranging the second fiber layer around the first fiber layer, wherein the second fiber layer is formed by at least one braided sleeve of dry fibers, and d) curing or consolidating the matrix material without supplying additional matrix material to produce the fiber-reinforced laminate.

8 Claims, 2 Drawing Sheets

(52) U.S. Cl.
CPC .............. *F17C 2203/0604* (2013.01); *F17C 2203/0673* (2013.01); *F17C 2209/2154* (2013.01); *F17C 2221/012* (2013.01); *F17C 2270/0168* (2013.01)

(56) References Cited

U.S. PATENT DOCUMENTS

| | | | |
|---|---|---|---|
| 8,932,695 | B1 | 1/2015 | Villarreal et al. |
| 2006/0096993 | A1 | 5/2006 | Takashima |
| 2010/0276434 | A1 | 11/2010 | Berger et al. |
| 2012/0094041 | A1 | 4/2012 | Parfrey |
| 2015/0192251 | A1* | 7/2015 | Tupper ................. B29C 70/086 156/196 |
| 2016/0348839 | A1 | 12/2016 | Saferna et al. |
| 2018/0345603 | A1* | 12/2018 | Bech ................. B29D 99/0028 |

FOREIGN PATENT DOCUMENTS

| | | |
|---|---|---|
| DE | 10 2005 053 245 A1 | 5/2006 |
| DE | 10 2014 223 127 A1 | 5/2016 |
| DE | 10 2017 206 521 A1 | 10/2018 |
| JP | 11-262955 A | 9/1999 |
| WO | WO-2013083662 A2 * | 6/2013 .............. F17C 1/002 |
| WO | WO 2017/088885 A1 | 6/2017 |
| WO | WO 2020/002462 A1 | 1/2020 |

OTHER PUBLICATIONS

German-language Written Opinion (PCT/ISA/237) issued in PCT Application No. PCT/EP2021/064736 dated Sep. 1, 2021 (six (6) pages).

German-language Search Report issued in German Application No. 10 2020 117 307.5 dated Mar. 10, 2021 with partial English translation (12 pages).

Chinese-language Office Action issued in Chinese Application No. 202180018518.6 dated Sep. 30, 2024 with English translation (13 pages).

* cited by examiner

METHOD FOR PRODUCING A PRESSURE VESSEL AND PRESSURE VESSEL

BACKGROUND AND SUMMARY

The invention relates to a method for producing a pressure vessel, more particularly a hydrogen tank for a motor vehicle, and to such a pressure vessel.

Hydrogen tanks which are used in vehicles, particularly motor vehicles, must on the one hand be light in weight, so as not to increase the vehicle weight unnecessarily, and must on the other hand be very stable, in order to sustain the necessary high pressures for storing the hydrogen. In a vehicle crash scenario, moreover, the tanks must not suffer critical failure.

Pressure vessels of these kinds typically have a liner, which forms a gastight lining of the pressure vessel, and an outer shell, which ensures the stability of the pressure vessel. The publication DE 10 2017 206 521 A1 discloses pressure vessels in which the outer shell is formed by a fiber-reinforced sandwich structure. The fiber-reinforced sandwich structure comprises a first fiber layer, which surrounds a cylindrical internal region and is wound about a longitudinal axis of the cylinder region, and a second fiber layer, which surrounds the cylinder region and its bordering cap regions and is braided at least in the cap region.

In order to produce the pressure vessel, according to DE 10 2017 206 521 A1, the first fiber layer is first applied and cured, and subsequently the second fiber layer is applied and cured. In an alternative process variant, the first and second fiber layers may be formed from dry fibers, jointly infiltrated with resin, and subsequently cured. A further variant entails the use of pre-impregnated fibers for both the first and second fiber layers, and the joint curing of both fiber layers.

Against this background, the object of the invention is to provide an alternative possibility for how a pressure vessel can be produced. The pressure vessel is to be produced more particularly in a manner which is economically viable and particularly favorable, and the method is to be compatible with mass production.

The object is achieved by a method and by a pressure vessel according to the independent claims. Further advantageous embodiments are apparent from the dependent claims and from the description hereinafter.

A method is specified for producing a pressure vessel, where the pressure vessel comprises a liner and a fiber-reinforced laminate which surrounds the liner and has a first fiber layer and a second fiber layer, which are incorporated in a matrix material, with the steps of:

a) providing the liner for storing a fluid, preferably hydrogen, having a cylinder region and two cap regions at opposite ends of the cylinder region, b) wrapping the liner at the cap regions and the cylinder region with a fiber material impregnated with the matrix material, to produce the first fiber layer already imbued with the matrix material, c) arranging the second fiber layer around the first fiber layer, the second fiber layer having been formed by at least one braided sleeve of dry fibers, and d) curing/consolidating the matrix material without supplying additional matrix material, to produce the fiber-reinforced laminate.

Stated using different words, the amount of matrix material applied when wrapping the liner with the first fiber layer is already the amount needed for the fiber-reinforced laminate as a whole. For this purpose, the fiber material for the first fiber layer is "overloaded" with the matrix material. As a result there is sufficient matrix material available to sufficiently wet or saturate the subsequently applied second fiber layer as well and to incorporate it as well into the laminate. As a result there is no need for subsequent infiltration of the fiber plies, thereby simplifying the plant technology required and making production cost-effective without having to accept any detraction from the stability of the pressure vessel.

The purpose of the liner is to store the fluid in the pressure vessel. The liner therefore has a fluid-tight configuration. Where the pressure vessel is used, for example, as a hydrogen tank, the liner in particular is impermeable to hydrogen. The liner is substantially cylindrical and has a cylinder region. The longitudinal axis of the liner is defined in correspondence with the cylinder region, and it also represents the longitudinal axis of the pressure vessel. The two ends of the cylinder region are each closed with a cap region. In one or both cap regions there may be an opening for a connection. The liner is preferably formed in one piece. The liner may be formed, for example, of plastic or of metal. In the latter case, the liner may contribute to the stability of the pressure vessel. The liner is configured preferably as a thermoplastic blow molding, enabling low wall thicknesses and a low weight to be realized.

Surrounding the liner is a fiber-reinforced laminate, which ensures the stability of the pressure vessel. This laminate contains a matrix material with fiber plies embedded therein. The fiber plies comprise reinforcing fibers, such as carbon fibers, glass fibers and/or aramid fibers, for example. The fiber plies are formed more particularly of continuous fibers. The matrix material used may be a thermoset or thermoplastic polymer material.

To produce the fiber-reinforced laminate, first a first fiber layer is applied and subsequently a second fiber layer is applied to this first fiber layer. In this arrangement, the first fiber layer is wound and the second fiber layer is formed as an interlaced structure. The term "fiber layer" is not restricted to one fiber ply; it is also possible for two or preferably more fiber plies to be disposed one over another to form a "fiber layer".

The winding of the first fiber layer takes place with a fiber material already impregnated with matrix material. The fiber material in this case is deliberately "overloaded" with matrix material. In other words, the amount of matrix material added to the fiber material is more than is needed later in the first fiber layer. The fraction of matrix material is instead selected such that it is sufficient for the fiber-reinforced laminate as a whole and also incorporates the second fiber layer composed of braid as well. Suitable fiber material, impregnated with matrix material, for the winding of the first fiber layer includes rovings impregnated, more particularly wet-impregnated, with thermoset matrix, pre-impregnated rovings or prepregs, and tapes reinforced, more particularly fiber-reinforced, with thermoplastic matrix, and hybrid rovings which in addition to the reinforcing fibers also contain thermoplastic fibers. The fiber volume fraction of thermoplastic fibers here is established such that the thermoplastic fraction is sufficient as matrix material.

In one preferred embodiment, the first fiber layer is produced by fiber winding with wet-impregnated rovings. For this purpose the rovings, immediately before the wrapping of the liner, for example, are drawn through a matrix bath or otherwise wetted with liquid thermoset matrix material. The rovings in this procedure, as described above, are deliberately overloaded with matrix material, and so after the end of the winding procedure the required amount of matrix material has already been applied. The matrix material of wet-impregnated fibers has a fairly low viscosity, and so the subsequently applied braid as well is thoroughly saturated and incorporated into the laminate. In this way the second fiber layer is incorporated particularly well into the matrix material in a simple manner.

The wound application of the first fiber layer may be accomplished, in one embodiment, by fiber winding or tape winding. Fiber winding is a deposition technique in which strands (rovings) of continuous fiber are wound lying closely together with one another around a core—in this case the liner. In the cylinder region the rovings are preferably wound at an angle, appropriate to the loading, to the longitudinal axis of the pressure vessel/liner. In the cap regions the wrapping may also take place in an angle slantwise to the longitudinal axis, so producing crossed plies and preventing the fibers slipping from the caps. In the case of tape winding, rather than rovings, a unidirectionally fiber-reinforced tape is employed, which is wound adjacently or with partial overlap around the core.

In an alternative embodiment, the first fiber layer is produced by wrapping the liner with a prepreg. A prepreg is a preimpregnated semifinished product in sheet form. It comprises continuous fibers already embedded in one or more plies in a thermoset matrix material, the matrix material being in a partly cured state. The prepreg blank may extend, for example, over the length of the pressure vessel. Using a prepreg, the first fiber layer can be wound around the liner in a particularly time-efficient way. When using a prepreg, additionally, the fibers in the cylinder region are oriented at an angle, compatible with the loading, to the longitudinal axis.

Since the necessary matrix material has already been applied with the first fiber layer, the subsequent, second fiber layer is formed exclusively by dry fibers. "Dry fibers" in this context are reinforcing fibers not impregnated with a matrix material.

The second fiber layer is formed by a braid. The second fiber layer extends preferably over the entire first fiber layer, in other words over both cap regions and the cylinder region of the liner.

In one embodiment, the second fiber layer is formed by overbraiding the liner and the first fiber layer with dry fibers. The braid fibers form a braided sleeve, which is formed externally around the first fiber layer. The braided sleeve in this embodiment is produced during the braiding operation directly around the liner and the first fiber layer, and is placed on the semifinished product to be overbraided. The liner equipped with the first fiber layer may for this purpose be guided, for example, by a radial braiding machine. The braided sleeve may comprise, for example, a biaxial braid or a triaxial braid, where additional upright threads are also carried parallel to the longitudinal axis of the pressure vessel. As a result of the braided application of the second fiber layer it is possible to change the braid angle during the braiding procedure and so deliberately, on the cap regions, for example, to form a different braid from that in the cylinder region. It is possible to apply two or more braided sleeves one over another.

In an alternative embodiment, the second fiber layer is applied by enrobing with one or more prefabricated braided sleeves. The braided sleeve, for example, is drawn or unwound from one side over the liner and the first fiber layer, until it extends from one cap region over the cylinder region to the other cap region. By pulling of the braid threads at the end, the braided sleeve can be adapted to the shape of the cap region. Because dry fibers are used for the braid, a braided sleeve of this kind can be readily prefabricated and stored, thereby reducing the production time for the pressure vessel.

The curing of the matrix material in step d) may advantageously take place in an oven process. This kind of curing of components is substantially more cost-favorable and quicker than curing in a temperature-controlled mold such as, for example, an RTM mold, thereby enabling a further reduction in the production costs.

In an alternative embodiment, the curing in step d) may take place in a temperature-conditioned mold. For this purpose the liner wrapped with the fiber layers is placed, for example, into a compression mold, the mold is closed, and the pressure vessel is compression-molded therein at elevated temperature and pressure and the matrix material is cured.

For shape retention, during the production of the pressure vessel, the liner may be subject to an internal pressure—for example, the liner may be filled with a fluid, such as air or water, for example, and placed under pressure.

The matrix system used is preferably a thermoset matrix system. In principle, it is also possible to use thermoplastic matrix systems in the method. Particularly suitable for that purpose, for example, would be the winding of thermoplastic fiber tapes. For application of the first and second fiber layers, the matrix material is heated and subsequently consolidated in step d). When a thermoplastic matrix material is used, it is possible optionally to omit a subsequent oven process or the use of a temperature-conditioned mold, with the effect of reducing the production costs.

Additionally specified is a pressure vessel having a liner for storing a fluid, with a cylinder region and two cap regions at opposite ends of the cylinder region, and a fiber-reinforced laminate which surrounds the liner and has a first fiber layer and a second fiber layer, which are incorporated in a common matrix material. The first fiber layer is wound around the liner at the cap regions and at the cylinder region, and the second fiber layer is formed of at least one braided sleeve which is arranged around the first fiber layer.

The pressure vessel may more particularly be a hydrogen tank for a motor vehicle. The pressure vessel described above is notable for a lightweight construction which is nevertheless highly stable.

A pressure vessel of this kind can be produced in a particularly economically viable way with the method described above.

Features and details described in connection with the pressure vessel are also valid in connection with the method of the invention, and vice versa in each case, and so reference can be/is always made reciprocally with regard to the disclosure in relation to the individual aspects of the invention.

Further advantages, features, and details of the invention are apparent from the description hereinafter, in which exemplary embodiments of the invention are described in detail with reference to the drawings. The features mentioned in the claims and in the description here may be essential to the invention in each case individually, by themselves, or in any combination. Insofar as the term "may" is used in this patent application, it relates both to the technical possibility and to the actual technical implementation.

Exemplary embodiments are elucidated below with reference to the appended drawings.

DETAILED DESCRIPTION OF THE DRAWINGS

Figure 1:
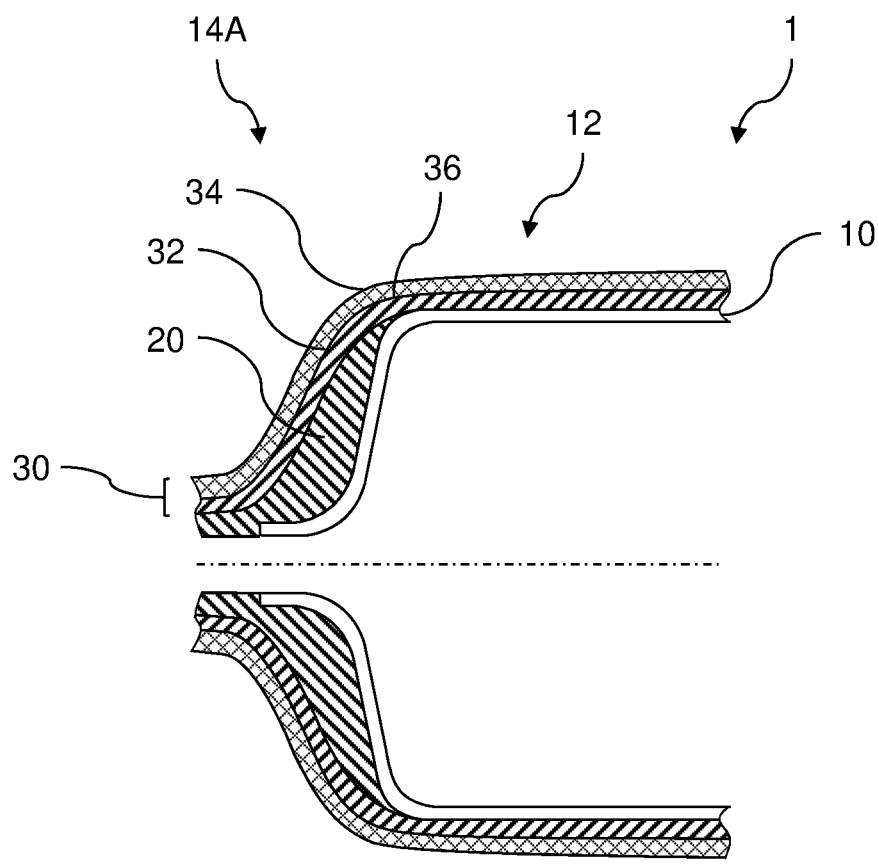
FIG. 1 shows a section of an illustrative pressure vessel in a view in longitudinal section.

FIG. 1 shows a longitudinal section through an illustrative pressure vessel 1 in the form of a hydrogen tank for a motor vehicle. Only the left half of the pressure vessel 1 is represented in FIG. 1. The pressure vessel 1 may in particular have a rotationally symmetrical design.

Figure 2:
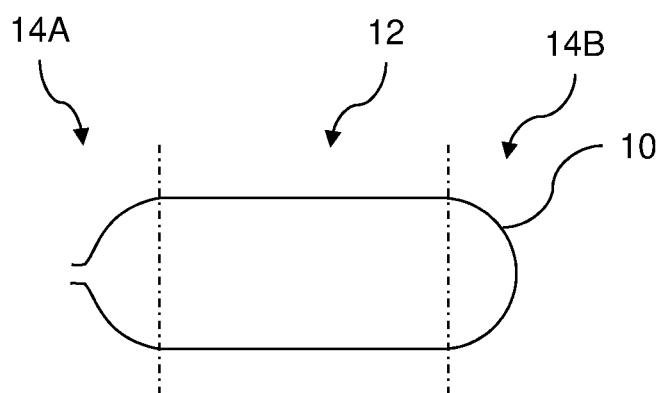
FIG. 2 shows a schematic representation of a liner.

The pressure vessel has a liner 10; see FIG. 2. The liner 10 has a cylinder region 12 and two cap regions 14A, 14B at the ends of the cylinder region 12. In FIG. 1 only one cap region 14A, and also part of the cylinder region 12, is represented. In the cap region 14A there may additionally be a connector 20 provided for the mounting of a valve, a so-called "boss". This may, for example, be a metal component with a thread, which is mounted onto the cap region 14A of the liner 10. At the other end of the cylinder region 12, the liner 10 has a second cap region 14B, not represented in FIG. 1, and in this region, for example, a closure or a further connection facility may be provided.

Formed on the outside around the liner 10 is a fiber-reinforced laminate 30. The fiber-reinforced laminate has a first fiber layer 32 and a second fiber layer 34. The first fiber layer 32 is wound around the liner 10, with one or more plies of fibers one above another being able to form the first fiber layer 32. Formed on the outside on the first fiber layer 32 is a second fiber layer 34. The second fiber layer 34 takes the form of a braid and may be formed by one or more braid plies. The first and second fiber layers 32, 34 each extend over the cylinder region and the cap regions of the liner.

Both fiber layers are embedded in a common matrix material 36.

Figure 3:
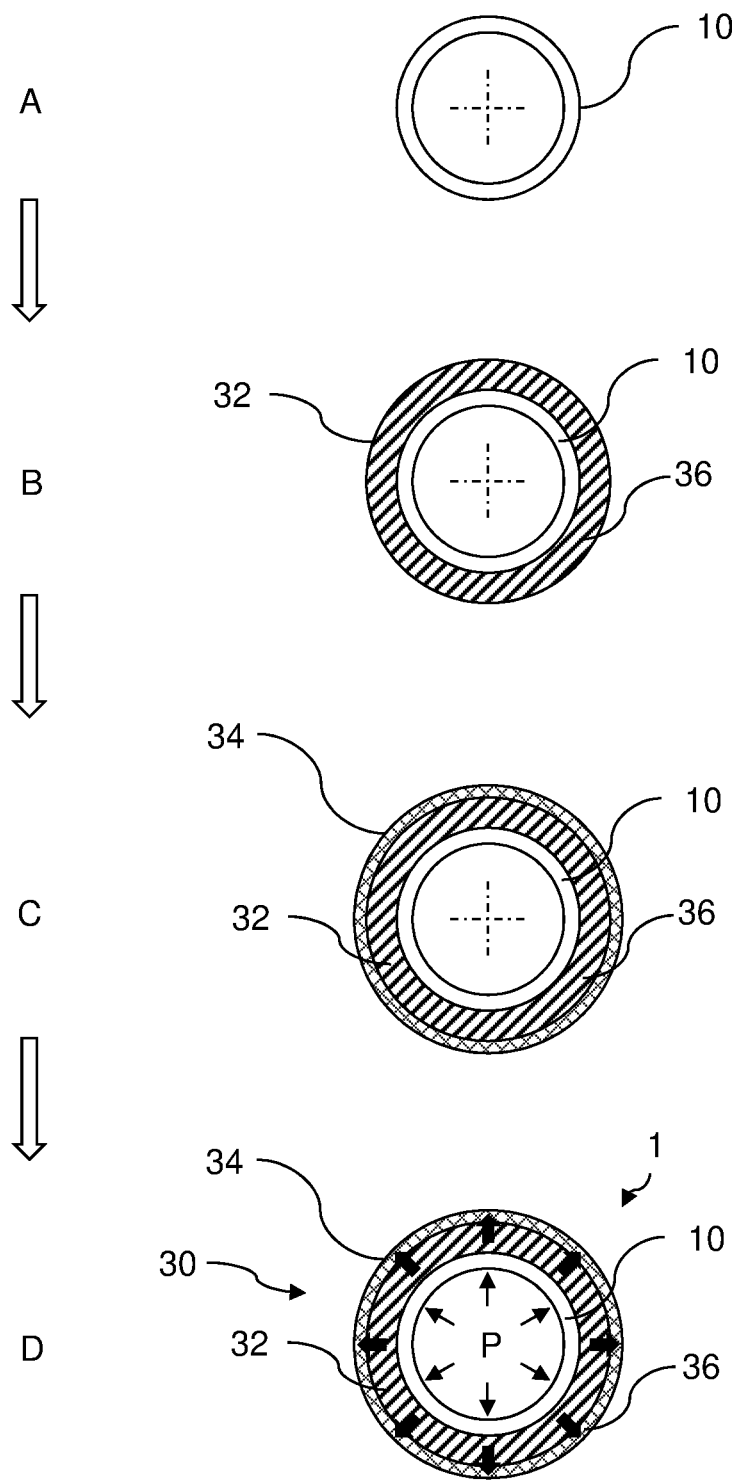
FIG. 3 shows a schematic representation of the pressure vessel at different points in time of the method, in a cross section.

FIG. 3 shows the production of the pressure vessel 1. The liner 10 is provided first in step A. The liner 10 is preferably a thermoplastic blow-molded element. Connectors or closures, not represented in FIG. 3, may be integrated in or mounted onto the liner 10.

In step B the first fiber layer 32 is applied. This is done by winding multiple layers of fibers, overloaded with resin, around the liner 10, so that the first fiber layer 32 is already imbued with the matrix material 36. The first fiber layer 32 is wound both onto the cap regions 14A, 14B and onto the cylinder region 12. Winding is accomplished preferably in a wet winding process.

In step C the second fiber layer 34 is arranged around the first fiber layer 32. The second fiber layer 34 is applied as a dry braid. For this purpose the braid may be provided as a prebraided sleeve and may be drawn over the liner 10 and the first fiber layer 34. Alternatively the braid of dry fibers is braided directly onto the first fiber layer 34. In this case it is preferred if the braid angle in the cylinder region 12 is constant. In the cap region 14A, 14B, the braid angle may vary and is preferably smaller than in the cylinder region 12.

In step D the matrix material 36 is cured to form the fiber-reinforced laminate. Because fibers overloaded with resin are used for the first fiber layer 32, sufficient matrix material 36 is applied in the winding process itself in order to infiltrate the braid 34 as well. Additional matrix material 36 is therefore not added in either step C or step D. The matrix material 36 is cured at elevated temperature, in an oven process, for example. The increased temperature lowers the viscosity of the matrix material 36, which also saturates the applied braid 34, represented by the arrows in FIG. 3. After the curing operation, both the first and the second fiber layers are incorporated in the matrix material 36. For curing, the layer structure may alternatively also be introduced into a compression mold (not represented), where the workpiece is additionally provided with an external pressure from the outside and press-molded. During this procedure, the liner may be filled with a fluid and placed under an internal pressure P for shape retention.

Alternatively to the method described, it is also possible to use a thermoplastic matrix material 36, in which case, for example, the first fiber layer 32 in the form of thermoplastic fiber tape may be wound around the liner 10. For deposition on the liner 10 and for subsequent infiltration of the braid 34, the thermoplastic matrix material may be heated, for example. The subsequent consolidation may take place with or without compression mold.

LIST OF REFERENCE SYMBOLS 1 pressure vessel
10 liner
12 cylinder region
14A, 14B cap regions
20 connector
30 fiber-reinforced laminate
32 first fiber layer
34 second fiber layer
36 matrix material
P internal pressure
A, B, C, D method steps

The invention claimed is:

1. A method for producing a pressure vessel, comprising:
   a) providing a liner for storing a fluid, having a cylinder region and two cap regions at opposite ends of the cylinder region;
   b) wrapping the liner at the cap region and the cylinder region with a fiber material impregnated with matrix material, to produce a first fiber layer already imbued with matrix material;
   c) arranging a second fiber layer around the first fiber layer, the second fiber layer having been formed by at least one braided sleeve of dry fibers, the second fiber layer saturated by the matrix material; and
   d) curing or consolidating the matrix material, without supplying additional matrix material, to produce a fiber-reinforced laminate surrounding the liner.

2. The method according to claim 1, wherein the impregnated fiber material used in step b) comprises wet-impregnated rovings, pre- impregnated rovings, hybrid rovings, unidirectionally fiber-reinforced tapes, or prepregs.

3. The method according to claim 1, wherein the first fiber layer is produced by fiber winding with wet-impregnated rovings.

4. The method according to claim 1, wherein the first fiber layer is produced by wrapping the liner with a prepreg.

5. The method according to claim 1, wherein the second fiber layer is produced by overbraiding the liner and the first fiber layer with dry fibers.

6. The method according to claim 1, wherein the second fiber layer is applied by enrobing with at least one prefabricated braided sleeve.

7. The method according to claim 1, wherein the curing in step d) takes place in an oven process.

8. The method according to claim 1, wherein
the curing in step d) takes place in a temperature-conditioned mold.

\* \* \* \* \*